United States Patent
Heibel

(10) Patent No.: US 10,109,380 B2
(45) Date of Patent: Oct. 23, 2018

(54) ION CHAMBER RADIATION DETECTOR

(71) Applicant: Westinghouse Electric Company LLC, Cranberry Township, PA (US)

(72) Inventor: Michael D. Heibel, Harrison City, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1339 days.

(21) Appl. No.: 13/974,384

(22) Filed: Aug. 23, 2013

(65) Prior Publication Data

US 2015/0055742 A1 Feb. 26, 2015

(51) Int. Cl.
*G21C 17/108* (2006.01)
*G01T 3/00* (2006.01)
*H01J 47/12* (2006.01)

(52) U.S. Cl.
CPC ............ *G21C 17/108* (2013.01); *G01T 3/008* (2013.01); *H01J 47/1233* (2013.01)

(58) Field of Classification Search
CPC .............................................. G21C 17/108
USPC ..................... 376/254; 250/370.04
See application file for complete search history.

(56) References Cited

U.S. PATENT DOCUMENTS

| | | | |
|---|---|---|---|
| 3,932,211 A | 1/1976 | Loving, Jr. | |
| 4,501,988 A * | 2/1985 | Mitrofanov | H01J 9/00 250/374 |
| 4,516,050 A | 5/1985 | Russo | |
| 4,590,401 A | 5/1986 | Goldstein et al. | |
| 4,623,508 A | 11/1986 | Glesius et al. | |
| 4,859,854 A | 8/1989 | Kershner et al. | |
| 5,425,064 A | 6/1995 | Termaat et al. | |
| 8,044,365 B2 | 10/2011 | DeWerd et al. | |
| 2006/0043308 A1 | 3/2006 | McGregor et al. | |
| 2012/0043469 A1 | 2/2012 | Park et al. | |
| 2012/0177166 A1 | 7/2012 | Seidel et al. | |
| 2012/0177167 A1 | 7/2012 | Heibel et al. | |

FOREIGN PATENT DOCUMENTS

| | | |
|---|---|---|
| CN | 2009102103506 | 9/2009 |
| JP | 55-67674 | 5/1980 |
| JP | H0797149 B2 | 10/1995 |
| JP | 2000147128 A | 5/2000 |
| JP | 2007163209 A | 6/2007 |

OTHER PUBLICATIONS

International Search Report and Written Opinion of the International Searching Authority for PCT/US2014/051041 dated Dec. 8, 2014 (Forms PCT/ISA/220, PSA/ISA/210, PSA/ISA/237).
Westinghouse Electric Company, LLC, EP Application No. 14838642.8 Search Report, 8 pages, Feb. 22, 2017.

* cited by examiner

*Primary Examiner* — Jack W Keith
(74) *Attorney, Agent, or Firm* — Joseph C. Spadacene; Westinghouse Electric Company LLC

(57) ABSTRACT

An in-core nuclear detector for detecting the neutron population surrounding the detector. The detector is an ion chamber having a cylindrical outer electrode that is insulated from a central electrode and capped to contain an Argon gas. An electron radiator that produces prompt neutron capture gamma radiation that is substantially, directly proportional to the local neutron population is disposed between the outer tubular electrode and the central electrode.

17 Claims, 4 Drawing Sheets

ION CHAMBER RADIATION DETECTOR

BACKGROUND

1. Field

The present invention pertains generally to apparatus for monitoring the power distribution within the core of a nuclear reactor, and more particularly, to an ion chamber detector having an enhanced fission gamma radiation response.

2. Related Art

In many of the aged reactors presently in operation reliance for nuclear flux measurements, as used in the reactor control and protection systems, has been placed on out-of-core detectors supplemented by an in-core flux mapping system, which has been in use since as early as 1967; with the latter originally intended to provide proof of the core design and some calibration measurements.

With a growing trend toward larger reactor cores, there has been some concern as to the possible adverse affects of core power distributions and whether out-of-core detectors could adequately detect such possible adverse power distributions. Test data showed that the split section out-of-core detectors, presently in use, responded to axial tilt, but the accuracy of the tilt measurements were affected by the geometry and construction materials employed at the detector wells and by the spacing between the vessel and the detectors. Correction factors have been developed for these affects, but there was some question as to whether out-of-core detectors will in all cases provide an adequate alarm of an adverse power distribution.

To obviate the foregoing concern, a method was developed for automatically monitoring the power distribution employing the moveable in-core detectors by providing a more accurate, detailed, automatic, frequently updated, data readout of the reactor core power distribution. The method, taught in U.S. Pat. No. 3,932,211, issued Jan. 13, 1976 and assigned to the Assignee of this invention, inserts the moveable detectors into the reactor core region during normal power operation according to a predetermined, intermittent, timed program. The measurement system that performs the periodic core power distribution measurements typically controls the simultaneous insertion and withdrawal of as many as six moveable detectors until measurements are obtained from all of the prescribed core radial locations. Each detector used is inserted through a common radial location to ensure that the detector sensitivities can be normalized to allow the production of an accurate "relative" core power distribution from detectors having different absolute sensitivities.

Preferably, a plurality of moveable detectors are arranged in electrically redundant groupings and are normally stored within the reactor thermal environment outside of the core reactivity region to minimize thermal cycling. In operation, the detectors are driven into the reactor, through the reactor vessels' lower head, through the core support plate and through prescribed fuel assembly bottom nozzles to the fuel assembly instrumentation tubes through which the detector is extended to the desired core elevation. As dictated by the predetermined, time program, alternate groupings of detectors are driven along corresponding linear paths within the instrumentation thimbles within the core at staggered time intervals governed by the reactor core physics. The programmed detector drive sequence is automatically reinitiated upon a given controlled reactivity change to provide the most meaningful data input to the reactor operator.

Moveable in-core detectors are now used by both boiling water reactors and pressurized water reactors to perform periodic detailed measurements of the core power distribution. The moveable detectors used are either primarily sensitive to neutron or gamma radiation. The type of detector most commonly used in both pressurized water reactors and boiling water reactors is a fission chamber style of detector. In this design, the signal output from the detector is directly proportional to the thermal neutron population surrounding the detector. The thermal neutron population is directly proportional to the local fission rate and local core power level. This response is generated by the use of significant amounts of highly enriched $U_{235}$ in the construction of the detector. Since $U_{235}$ is a special nuclear material, the cost to purchase and operate the moveable fission chambers is quite high. The moveable fission chambers are also quite delicate, so they are subject to frequent mechanical failure. The major technical benefit associated with their use is the direct relationship between the output signal and the local thermal neutron population and the direct relationship that the thermal neutron population has with the local core power production rate. FIG. 1 provides a layout schematic of a miniature fission chamber 10. The miniature fission chamber has a stainless steel tubular casing 12 that is capped at both ends and forms an outer electrode. $Al_2O_3$ ceramic insulators 16 support a central mineral filled coaxial output electrode 18, which is insulated from the outer electrode 12. The stainless steel casing 12 surrounds a central chamber 14 that is filled with an Argon filler gas 22 with the walls of the chamber 14 coated with 90% enriched $U_{235}$ and $U_3O_3$. A detector bias voltage 32 of between 20 and 150 volts DC is maintained between the two electrodes. In operation, an incident thermal neutron 28 causes a fission event 30 within the enriched $U_{235}$ resulting in high energy ionizing fission fragments 26 which create ionized gas molecules 24 within the Argon gas. The voltage bias on the central electrode 18 collects the ionized gas particles 24 resulting in a detector output 34 which is proportional to the fission events 30 resulting from the incident thermal neutrons 28.

A moveable detector design using a miniature ion chamber 10 has been recently introduced for use in a boiling water reactor. This type of detector also produces a signal proportional to the local core power, but the signal is stimulated by gamma radiation interactions in the ionization chamber region of the detector. This type of detector does not require $U_{235}$ as the stimulation for the output signal, so the cost and upkeep of this type of detector is significantly less than for a fission chamber style. The detectors also tend to be more rugged than fission chamber moveable detectors. The most limiting issue associated with the use of an ion chamber detector is the much lower signal output corresponding to a given local core power level. The use of this style of detector requires the use of very sensitive and expensive signal processing electronics. There is also an uncertainty that needs to be included in the core power distribution measurement uncertainty to account for the non-single valued relationship between output signal and local fission rate or core power. This power distribution measurement uncertainty increase potential may actually reduce the maximum power output that can be achieved by the reactor operator.

FIG. 2 provides a longitudinal cross section of a layout schematic of a miniature ion chamber 36 with FIG. 2B showing a cross section taken orthogonal to the sectional view shown in FIG. 2A. The miniature ion chamber 36 has an outer metal casing 38 that forms the outer electrode and insulated end caps 40 and 42 that support a central electrode 44. Similar in construction to the miniature fission chamber 10, the casing 38 surrounds a central chamber 50 that is filled with a fill gas 48.

Each style of moveable detector has suboptimal performance characteristics that significantly increase the cost of operation of the detector system. Accordingly, an improved detector is desired that is more rugged and less expensive to operate than those currently employed.

Additionally, such a detector design is desired that will minimize the uncertainty that has to be factored in to the core power measurements.

SUMMARY

These and other objects are achieved by an ion chamber radiation detector with an enhanced fission gamma radiation response. The ion chamber has an outer tubular electrode having an upper and lower end closed off by insulated end caps that electrically insulate the outer tubular electrode from a central electrode that substantially extends from the lower end cap up and through the upper end cap. An electron radiator that produces prompt neutron capture gamma radiation that is substantially, directly proportional to the local neutron population is disposed between the outer tubular electrode and the central electrode. Desirably, the electron radiator is constructed from a material having a high Z value with which prompt neutron capture gamma radiation interacts through photoelectric and Compton scattering mechanisms. Preferably, the electron radiator is constructed from one or more materials selected from a group of metals comprising platinum, gold, manganese, tungsten and cadmium and, more preferably, mainly from a group of metals comprising manganese, tungsten and cadmium.

In one embodiment, the electron radiator comprises a plurality of electron radiators that are spaced around the central electrode and preferably extends substantially between the lower end cap and the upper end cap.

The invention also contemplates a nuclear reactor power distribution monitoring system having a plurality of in-core detectors that monitor power at different axial and radial locations within a core of the nuclear reactor. At least some of the in-core detectors comprise the foregoing ion chamber design. In one such embodiment, the ion chambers are moveable in-core detectors that substantially traverse an axial length of the core at different core radial locations.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

The primary side of nuclear power generating systems which are cooled with water under pressure comprises a closed circuit which is isolated from and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the vessel form a loop of the primary side.

Figure 1:
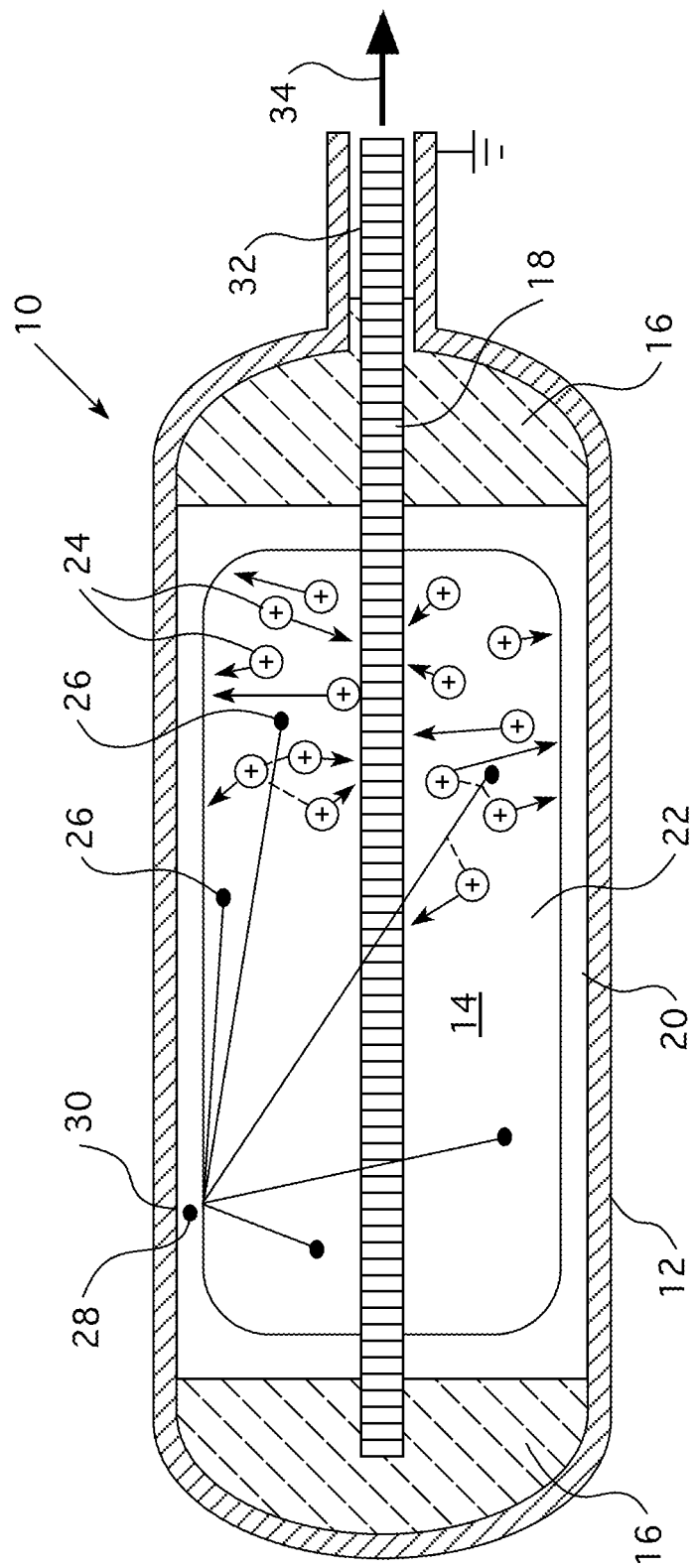
FIG. 1 is a cross section of a fission chamber employed as a moveable neutron detector.
Figure 2A:
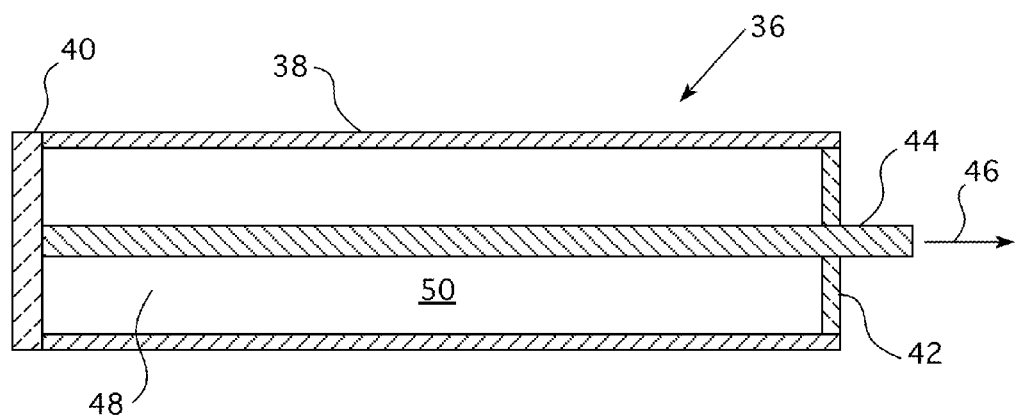
FIG. 2A is a schematic representation of a longitudinal cross section of a miniature ion chamber.
Figure 2B:
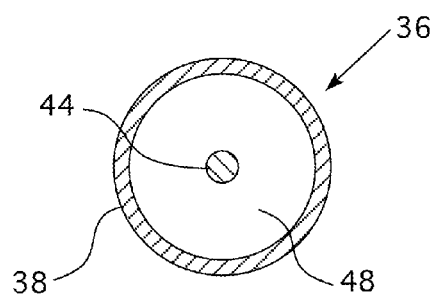
FIG. 2B is a schematic cross section of a miniature ion chamber taken along a plane orthogonal to the plane of the cross section of FIG. 2A.
Figure 3:
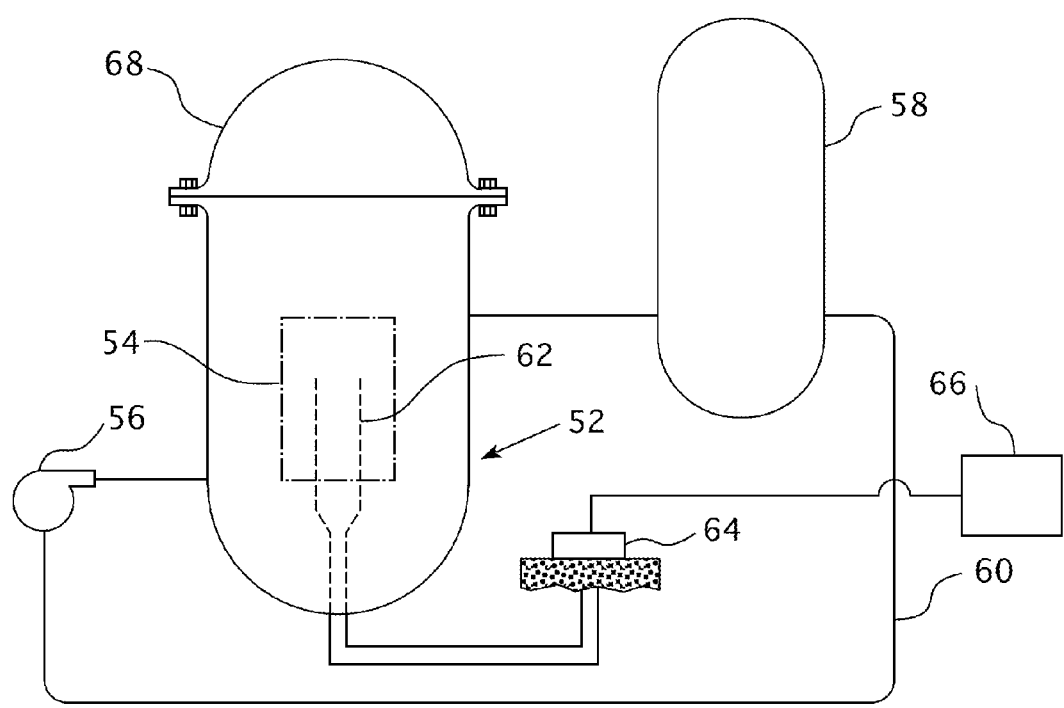
FIG. 3 is a simplified schematic of a nuclear reactor system having moveable in-core detectors that can benefit from this invention.

For the purpose of illustration, FIG. 3 shows a simplified nuclear reactor primary system, including a generally cylindrical reactor pressure vessel 52 having a closure head 68 enclosing a nuclear core 54. A liquid reactor coolant, such as water, is pumped into the reactor vessel 52 by pump 56 through the core 54 where heat energy is absorbed and is discharged to a heat exchanger 58, typically referred to as a steam generator, in which is heat is transferred to a utilization circuit (not shown), such as a steam driven turbine generator. The reactor coolant is then returned to the pump 56 completing the primary loop. Typically, a plurality of the above described loops are connected to a single reactor pressure vessel 52 by reactor coolant piping 60. Though not shown, at least one such loop includes a pressurizer for maintaining the pressure in the system.

As previously mentioned, moveable in-core detectors 62 are used by both boiling water reactors and pressurized water reactor style reactors to perform periodic detailed measurements of the core power distribution. The detectors 62 are inserted into the reactor core 54 during normal power operation according to a predetermined, intermittent, time program. Upon insertion, the detectors are automatically driven through the core region along fixed predetermined paths. The outputs of the detectors are recorded as a function of core location to provide a graphical representation of the reactor power distribution. The outputs of the detectors are fed through a seal table 64 to a control and monitoring system 66 responsible for implementing the time program. The moveable detectors 62 used are either primarily sensitive to neutron or gamma radiation. Each style of detector has suboptimal performance characteristics that significantly increase the cost of operation of the detector system. The gamma radiation detection device claimed hereafter utilizes a combination of the advantages of fission chamber style detectors and ion chamber style detectors to provide a detector capable of measuring the relative core power distribution in both pressurized water reactor and boiling water reactor style reactors that allows a significant reduction in the cost to own and operate the core power distribution measurement system.

Figure 4A:
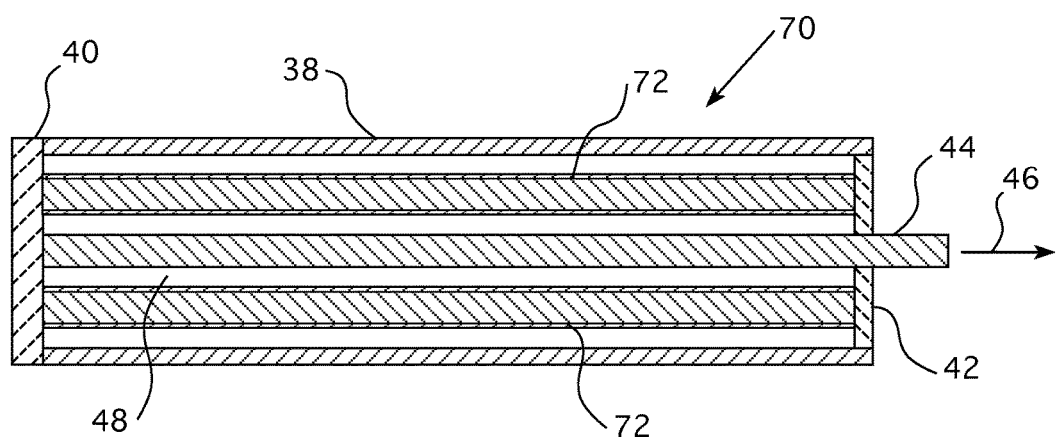
FIG. 4A is a longitudinal cross sectional view of an ion chamber constructed in accordance with one embodiment of this invention.
Figure 4B:
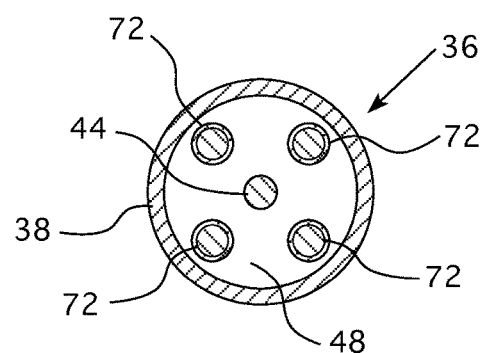
FIG. 4B is a cross section of the ion chamber shown in FIG. 4A taken along the plane orthogonal to the cross section shown in FIG. 4A.

FIGS. 4A and 4B provide a schematic of the preferred embodiment of the invention claimed hereafter. The fundamental difference between FIGS. 2A and 2B and 4A and 4B is the inclusion of an additional structure 72 in the ionization volume of the device, made of a metal such as natural manganese, tungsten or cadmium, which serves to produce high energy prompt neutron capture gamma radiation that is directly proportional to the local neutron population. This additional prompt neutron capture gamma radiation interacts through photoelectric and Compton scattering mechanisms with a high Z material, such as platinum or gold, surrounding the gamma radiator element to produce high energy electrons that also enhance the ionization in the gas fill 48 of the detector 70. This additional ionization greatly enhances the ionization current output 46 from the detector 70. This approach serves to enhance the signal level output from the device relative to the standard ion chamber 36 design without use of special nuclear material. The "Z" score, in statistics, indicates how far and in what direction, that item deviates from its standard distribution mean. Expressed in units of its distribution standard deviation Z scores are sometimes called "standard scores." The Z score transformation is especially useful when seeking to compare the relative standings of items from distributions with different means and/or different standard deviations.

The addition of a number of electron radiators 72, such as the four shown in FIG. 4B, spaced around the center electrode 44 between the center electrode 44 and the outer electrode 38, serves to enhance the signal level output from the device 70 relative to the standard ion chamber design 36 without the use of special nuclear material. The use of a relatively inexpensive prompt gamma radiator such as manganese, tungsten or cadmium allows the sensitive portion of the detector to be easily contained in a very robust physical package. Since the prompt sensitivity to the local neutron population is enhanced relative to the standard ion chamber 36, the uncertainty in the relationship between the signal and the true local core power level is reduced. The increase in the output signal from the stimulation of the local power distribution reduces or eliminates the need for extremely sensitive and expensive signal measurement electronics. The optimized design of the central core of this device will allow the use of the existing moveable detector signal measurement electronics so that the cost of implementation of this detector design will be minimized. This device may also be used as a stationary detector in other ion chamber applications where enhanced neutron sensitivity is a benefit, such as in reactor power level monitoring applications.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. An ion chamber radiation detector with enhanced fission gamma radiation response comprising:
   an outer tubular cathode electrode having an upper and lower end;
   a lower electrically insulated end cap closing off the lower end of the outer tubular electrode;
   an upper electrically insulated end cap closing off the upper end of the outer tubular electrode;
   a central anode electrode extending substantially from the lower end cap up and through the upper end cap;
   an electron radiator that produces prompt neutron capture gamma radiation that is substantially, directly proportional to the local neutron population disposed between and spaced from the outer tubular electrode and the central electrode; and
   a filler gas occupying the space between the outer tubular electrode, the central electrode, the electron radiator, the upper electrically insulated end cap and the lower electrically insulated end cap.

2. The ion chamber radiation detector of claim 1 wherein the electron radiator is constructed from a material having a high Z value with which prompt neutron capture gamma radiation interacts with through photoelectric and Compton scattering mechanisms.

3. The ion chamber radiation detector of claim 1 wherein the electron radiator is constructed from one or more materials selected from a group of metals comprising platinum, gold, manganese, tungsten and cadmium.

4. The ion chamber radiation detector of claim 1 wherein the electron radiator is mainly constructed from a group of metals comprising manganese, tungsten and cadmium.

5. The ion chamber radiation detector of claim 4 wherein the electron radiator is at least partially coated with either or both platinum or gold.

6. The ion chamber radiation detector of claim 1 including a plurality of electron radiators that are spaced around the central electrode.

7. The ion chamber radiation detector of claim 6 wherein the electron radiators extend substantially between the lower end cap and the upper end cap.

8. The ion chamber radiation detector of claim 1 wherein the electron radiator extends substantially between the lower end cap and the upper end cap.

9. A nuclear reactor power distribution monitoring system having a plurality of in-core detectors that monitor power at different axial and radial locations within a core of the nuclear reactor, the in-core detectors comprising ion chambers comprising;
   an outer tubular cathode electrode having an upper and lower end;
   a lower electrically insulated end cap closing of the lower end of the outer tubular electrode;
   an upper electrically insulated end cap closing off the upper end of the outer tubular electrode;
   a central anode electrode extending substantially from the lower end cap up and through the upper end cap;
   an electron radiator that produces prompt neutron capture gamma radiation that is substantially, directly proportional to the local neutron population disposed between the outer tubular electrode and the central electrode;
   an electrical bias electrically connected to the anode;
   a ground connected to the cathode; and
   a filler gas occupying the space between the outer tubular electrode, the electron radiator, the upper electrically insulated end cap and the lower electrically insulated end cap.

10. The nuclear reactor power distribution monitoring system of claim 9 wherein the ion chambers are moveable in-core detectors that substantially traverse an axial length of the core at different radial locations within the core.

11. The nuclear reactor power distribution monitoring system of claim 9 wherein the electron radiator is constructed from a material having a high Z value with which prompt neutron capture gamma radiation interacts with through photoelectric and Compton scattering mechanisms.

12. The nuclear reactor power distribution monitoring system of claim 9 wherein the electron radiator is constructed from one or more materials selected from a group of metals comprising platinum, gold, manganese, tungsten and cadmium.

13. The nuclear reactor power distribution monitoring system of claim 9 wherein the electron radiator is mainly constructed from a group of metals comprising manganese, tungsten and cadmium.

14. The nuclear reactor power distribution monitoring system of claim 13 wherein the electron radiator is at least partially coated with either or both platinum or gold.

15. The nuclear reactor power distribution monitoring system of claim 9 including a plurality of electron radiators that are spaced around the central electrode.

16. The nuclear reactor power distribution monitoring system of claim 15 wherein the electron radiators extend substantially between the lower end cap and the upper end cap.

17. The nuclear reactor power distribution monitoring system of claim 9 wherein the electron radiator extends substantially between the lower end cap and the upper end cap.

\* \* \* \* \*